(12) United States Patent
Baelde et al.

(10) Patent No.: US 11,480,550 B2
(45) Date of Patent: Oct. 25, 2022

(54) METHOD AND DEVICE FOR MAPPING COMPONENTS FOR DETECTING ELONGATION DIRECTION

(71) Applicants: SAFRAN, Paris (FR); CENTRE NATIONAL DE LA RECHERCHE SCIENTIFIQUE, Paris (FR)

(72) Inventors: Aurelien Baelde, Moissy-Cramayel (FR); Frederic Jenson, Moissy-Cramayel (FR); Claire Prada, Moissy-Cramayel (FR)

(73) Assignees: CENTRE NATIONAL DE LA RECHERCHE SCIENTIFIQUE, Paris (FR); SAFRAN, Paris (FR)

( * ) Notice: Subject to any disclaimer, the term of this patent is extended or adjusted under 35 U.S.C. 154(b) by 122 days.

(21) Appl. No.: 16/981,230

(22) PCT Filed: Mar. 13, 2019

(86) PCT No.: PCT/FR2019/050541
§ 371 (c)(1),
(2) Date: Sep. 15, 2020

(87) PCT Pub. No.: WO2019/180347
PCT Pub. Date: Sep. 26, 2019

(65) Prior Publication Data
US 2021/0025855 A1 Jan. 28, 2021

(30) Foreign Application Priority Data
Mar. 22, 2018 (FR) ...................................... 1852461

(51) Int. Cl.
*G01N 29/48* (2006.01)
*G01N 29/22* (2006.01)
(Continued)

(52) U.S. Cl.
CPC ........... *G01N 29/48* (2013.01); *G01N 29/225* (2013.01); *G01N 29/265* (2013.01);
(Continued)

(58) Field of Classification Search
CPC .... G01N 29/48; G01N 29/225; G01N 29/265; G01N 29/4418; G01N 29/4472; G01N 2291/106; G01N 29/262
See application file for complete search history.

(56) References Cited

U.S. PATENT DOCUMENTS

| | | | | |
|---|---|---|---|---|
| 7,703,327 B2* | 4/2010 | Georgeson | ........... | G01N 29/221 73/624 |
| 11,085,900 B2* | 8/2021 | Baelde | ................ | G01N 29/225 |
| 2021/0072197 A1* | 3/2021 | Tian | ..................... | G01N 29/265 |

FOREIGN PATENT DOCUMENTS

| | | |
|---|---|---|
| EP | 2594935 A1 | 5/2013 |
| JP | 2012-247262 A | 12/2012 |

OTHER PUBLICATIONS

International Search Report and Written Opinion received for PCT Patent Application No. PCT/FR2019/050541, dated Jun. 26, 2019, 17 pages (7 pages of English Translation and 10 pages of Original Document).

* cited by examiner

*Primary Examiner* — Xin Y Zhong
(74) *Attorney, Agent, or Firm* — Womble Bond Dickinson (US) LLP

(57) ABSTRACT

The invention concerns a method for the non-destructive mapping of a component, in order to determine an elongation direction of the elongate microstructure of the component at at least one point of interest, characterised in that it comprises at least two successive intensity measurement steps comprising the following steps: a sub-step of rotating a linear transducer into a plurality of angular positions, said (Continued)

Figure 1:
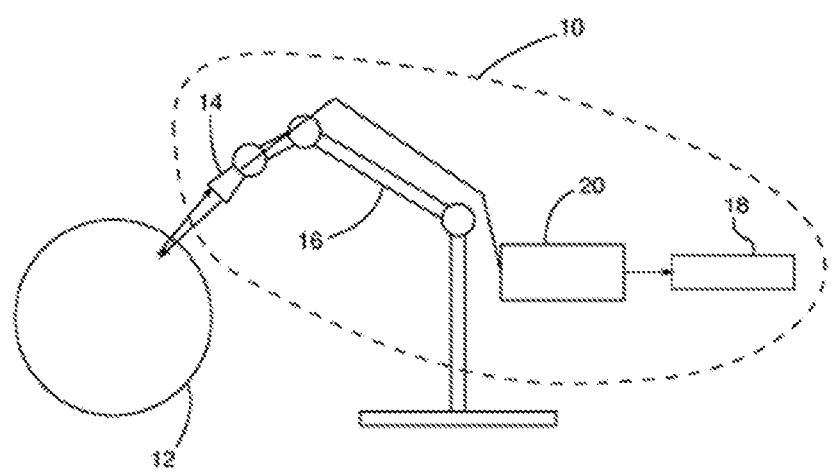

linear transducer comprising a plurality of transducer elements, a sub-step of emitting a plurality of elementary ultrasonic beams at each angular position, a sub-step of measuring a plurality of backscattered signals resulting from the backscattering of the elementary ultrasonic beams by said elongate microstructure, the intensity measurement steps making it possible to obtain two series of intensities measured according to two axes of rotation, and in that the method comprises a step of combining the measured series of intensities so as to determine the elongation direction of the microstructure at said at least one point of interest.

8 Claims, 4 Drawing Sheets

(51) Int. Cl.
    *G01N 29/265*    (2006.01)
    *G01N 29/44*    (2006.01)
(52) U.S. Cl.
    CPC ..... *G01N 29/4418* (2013.01); *G01N 29/4472* (2013.01); *G01N 2291/106* (2013.01)

METHOD AND DEVICE FOR MAPPING COMPONENTS FOR DETECTING ELONGATION DIRECTION

1. TECHNICAL FIELD OF THE INVENTION

The present invention relates to the general field of ultrasonic transducers with multiple elements. In particular, the present invention applies to the mapping and to the non-destructive inspection of components comprising an elongated microstructure.

2. TECHNOLOGICAL BACKGROUND

The prior art comprises, in particular, the document "Effect of microstructural elongation on backscattered field: Intensity measurement and multiple scattering estimation with a linear transducer array" by Aurélien Baelde et al., published in ULTRASONICS, vol. 82, 20 Sep. 2017, pages 379-389; as well as patent applications published under numbers EP-A1-2 594 935 and JP-A-2012 247262.

In the field of aeronautics, it is important to check the integrity of forged components intended to be fitted in an aircraft, in particular forged rotating components. These components are formed of a material, for example titanium or a titanium alloy, comprising a crystalline structure and a microstructure. By definition, the crystalline structure of a component defines the structure of this component to a scale of the order of one tenth of a nanometre. The microstructure of a component defines the structure of this component at a scale of between one nanometre and a centimetre.

The crystalline structure of a component is inspected using methods based on the diffraction of electromagnetic waves, for example the diffraction or X-rays. The microstructure of a component is inspected using methods based on the reflection, the scattering, and/or the backscattering of acoustic waves, for example ultrasound.

Thus there are known methods of ultrasound inspection intended to detect defects in a component. A defect can comprise, for example, laminations situated between two layers forming the component, or also surface or volume discontinuities of said component. These methods consist of producing an ultrasonic beam in the direction of a component to be inspected, and analysing the signals reflected, scattered and backscattered by the defects situated in this component.

However, these methods and these devices do not make it possible to detect an elongated microstructure situated in a component to be inspected.

This is because a component to be inspected can comprise one or more elongated microstructures. This is the case, in particular, with components made from a titanium or titanium alloy cylindrical billet. During the production of these components, for example during forging, one or more elongated microstructures are formed in these components, corresponding to the elongation of the grains of the polycrystalline material.

However, a disadvantage of a component comprising an elongated microstructure is that, during inspection of this component by an ultrasonic beam, the backscattering of the ultrasonic beam with this elongated microstructure produces a noise, called structural noise. This structural noise interferes with the signals from the reflection, from the scattering and/or from the backscattering of the ultrasonic beam by the defects situated in the component, and masks some of the signals measured during inspection of the component.

This disadvantage is all the more notable when the component to be inspected comprises a complex shape or an anisotropic internal structure. It is in particular the case of axisymmetric-shaped components, or components made from metal materials forged from titanium or titanium alloy.

To overcome these disadvantages, it has been shown that the amplitude of the structural noise depends on the relative position and on the relative orientation of the ultrasonic transducer used to inspect the component and that the geometry of the known ultrasonic transducers does not make it possible to precisely detect the presence of an elongated microstructure situated in a component to be inspected.

Thus a proposed solution has been to use a linear transducer comprising a plurality of transducer elements emitting a plurality of elementary ultrasonic beams, and to focus this plurality of elementary ultrasonic beams to form a focal region on the component.

The transducers receive structural noise signals through the backscattering of elementary ultrasonic beams by the elongated microstructure. These structural noise signals are used to determine an elongation direction of the elongated microstructure when an amplitude of one of the plurality of structural noises measured is minimal according to different positions of the linear transducer.

However, this solution has several disadvantages. Firstly, the detection of the elongation direction is not optimal, as the structural noise signals are not necessarily interpretable easily and the minimum amplitude sought can be difficult to determine or not correspond precisely with the elongation direction.

Furthermore, the elongation direction detected may not be correct as, when the linear transducer picks up the structural noise signals along a plane of the linear transducer, the elongation direction determined is in a measuring plane parallel to this plane of the linear transducer and thus corresponds to the projection of the actual elongation direction on this measuring plane.

Finally, to go beyond the non-destructive inspection, it can be useful to obtain a complete, non-destructive mapping of the components in order to improve the detection of faulty manufacturing. Such a mapping would indeed make it possible to know the elongation of the component in different points of the component.

The inventors have thus sought a solution to these disadvantages.

3. AIMS OF THE INVENTION

The invention aims to overcome at least some of the disadvantages of known non-destructive mapping methods.

In particular, the invention aims to provide, in at least one embodiment of the invention, a non-destructive mapping method allowing better precision of the determination of the elongation direction of the microstructure of a component to be inspected, at one or more points of interest of the component.

The invention also aims to provide, in at least one embodiment, a method making it possible to develop a 3D mapping of the elongation direction of the microstructure of a component to be inspected at several points of interest of the component.

The invention also aims to provide, in at least one embodiment, a method allowing non-destructive inspection of the validity of components according to their elongation direction.

The invention also aims to provide, in at least one embodiment of the invention, a non-destructive mapping device implementing this method.

4. DISCLOSURE OF THE INVENTION

To do this, the invention relates to a method for non-destructive mapping of a component comprising an elongated microstructure, to determine an elongation direction of the elongated microstructure at at least one point of interest of the component, characterised in that it comprises at least two successive intensity measurement steps comprising the following steps:

- a sub-step of rotating a linear transducer in a plurality of angular positions each defining an angle of rotation about an axis of rotation passing through said at least one point of interest, said linear transducer extending along a main plane and comprising a plurality of transducer elements aligned along a main direction of said linear transducer,
- a sub-step of emitting a plurality of elementary ultrasonic beams at each angular position by each of said plurality of transducer elements in the direction of said point of interest,
- a sub-step of measuring by each of said plurality of transducer elements the intensity at each angular position of a plurality of backscattered signals resulting from the backscattering of the elementary ultrasonic beams by said elongated microstructure,
- a first intensity measurement step of making it possible to obtain a first series of intensities measured along a first axis of rotation, and a second intensity measurement step making it possible to obtain a second series of intensities measured along a second axis of rotation different from the first axis of rotation,
- and in that the method comprises a step of combining the first series of measured intensities and the second series of measured intensities so as to determine the elongation direction of the microstructure at said at least one point of interest and a mapping step attributing at each point, the elongation direction determined at said point.

A mapping method according to the invention therefore makes it possible to determine the elongation of the microstructure without proceeding with steps destructive of the component. Furthermore, the mapping method according to the invention does not only carry out a scanning of the whole component but carries out at least two measurements of intensities of backscattered signals for each point of interest so as to determine more precisely the elongation direction (also called extension direction). In particular, in the prior art, the elongation direction was measured only once per point of interest and this elongation direction did not correspond to the real elongation direction since the measurement made it possible to determine only a direction parallel to the main direction which corresponds, in reality, to a projection of the real elongation direction on a plane parallel to the main plane of the linear transducer.

The mapping of the component makes it possible to improve the detection of a faulty component, both upstream by the general knowledge of the elongation directions of the component making it possible to better characterise it, and downstream by making it possible to determine conditions of validity of a mapped component to decide if it complies with the manufacturing requirements or if it must be rejected.

In the invention, the second measurement makes it possible to come close to the real elongation direction by combining two "projections" of elongation direction for each measurement.

When other measurements are added along other axes of rotation, the precision increases and the elongation direction determined is all the closer to the real elongation direction, but the increase in the number of measurements to be taken and therefore the time taken by these measurements can reduce the interest in view of the precision obtained with a low number of measurements. Generally, two or three measurements are sufficient for along two or three axes.

Preferably, the angle between the first axis of rotation and the second axis of rotation is between 20° and 90°.

The linear transducer is equipped with rectangular transducer elements and is preferably mounted on a translation/rotation system making it possible to position and orient the transducer at any point around the component. The translation/rotation system is a 6-axis system (3 translations, 3 rotations).

The component to be mapped is immersed in a fluid allowing the propagation of ultrasonic waves and backscattered signals.

The transducer elements are placed contiguously, by their longest side. The transducer elements can preferably be provided with a prefocus lens according to their greatest dimension in order to adapt the ultrasonic field to the curve of the interface of the component to be mapped. The linear transducer is used to focus an ultrasonic beam at various depths within the component. This focus is achieved electronically by applying, to the elements of the linear transducer, signals offset by a delay law making it possible to focus the beam at said depths by passing through the fluid/component interface, in particular at the depths corresponding to the position of the point of interest where intensity measurements of backscattered signals are to be obtained.

Advantageously, and according to the invention, the mapping method further comprises a standardisation of the intensities measured according to a sinusoidal function expressing the intensity measured according to the angle of rotation of the transducer, the sinusoidal function having in particular, as a parameter, an amplitude representing a confidence index of the elongation, and the angle at which the sinusoidal function reaches its maximum defines a straight line perpendicular to the elongation direction at said at least one point of interest along a plane parallel to the main plane of the linear transducer.

According to this aspect of the invention, the standardisation of the intensities measured consists of approximating the intensities measured in the form of a sinusoidal function, in particular a sine function, wherein certain parameters make it possible to characterise the elongation direction measured by this measurement (which is the elongation direction projected as expressed above and not the real elongation direction).

In particular, the sinusoidal function f(x) can, for example, be expressed in the following form:

$$f(x) = E\cos(w(x-x0)) + d$$

with E the confidence index of the elongation, x0 the angle at which the sinusoidal function reaches its maximum, and w and d adjustment variables.

The parameters E and x0 can be used for easily calculating the combination of series of intensities measured. In particular, these parameters E and x0 make it possible respectively to determine the norm and direction of the vector representing the projection of the real elongation direction on the plane parallel to the main plane of the linear transducer during the measurement.

Advantageously, and according to the invention, the elongation direction of the microstructure is determined for a plurality of points of interest distributed over the component and in that it comprises a step of 3D mapping of the component associating, with each point of interest, its elongation direction in a 3D representation of the component.

According to this aspect of the invention, if numerous points representative of the component are used as points of interest, an overall 3D map of the component is obtained, making it possible for example to obtain a 3D representation of the component with a view of all of the elongation directions. The knowledge of all the elongation directions make it possible to better understand the elongated microstructure of the component.

The selection of the points of interest can be optimised to minimise the inspection time and the quantity of data to be recorded. Moreover, it is possible not to directly take the measurements of two series of intensities along different axes for the same point of interest successively, but a first measurement may be taken for each point of interest initially to obtain a first series of intensities measured for each point of interest, then a second measurement may be taken for each point of interest secondly to obtain a second series of intensities measured for each point of interest. The combination of the series of intensities measured can be achieved for each point of interest as soon as the number of series for this point is sufficient.

Advantageously, and according to the invention, the mapping method comprises a step of determining actual dimensions of grains of the elongated microstructure at said point of interest, said step comprising:
- a step of calculating backscattered intensity models according to a predetermined mathematical relationship, each model being calculated with said mathematical relationship by taking for parameters, different dimensions of the grains of the elongated microstructure,
- a step of comparing one of the series of intensities measured with said intensity models, the actual dimensions of the grains of the elongated microstructure corresponding to the dimensions used as a parameter with the backscattered intensity model closest to the series of intensities measured.

According to this aspect of the invention, it is thus possible to determine the dimensions of the elongated microstructure at the point of interest, by comparing the intensity measured at models expressed along dimensions used as parameters. The comparison of the curves obtained makes it possible to determine the closest curves and thus to deduce the dimensions of the elongated microstructure thanks to the model associated with the curve closest to the experimental values.

The comparison step can be carried out automatically by an optimisation algorithm, or manually by adjusting each dimension used as a parameter to adjust the curve of the model to the experimental curve of the series of intensities measured.

Advantageously, and according to the latter aspect of the invention, the predetermined mathematical relationship is written in the form:

$$I(\theta) = \frac{1}{N}$$

$$\sum_{i=1}^{N} \frac{2\pi(2a)^2(2b)^2}{L_x L_y} f^{x_1^i, x_2^i} \left( \frac{A_i}{L_x} \cos(\theta) - \frac{B_i}{L_y} \sin(\theta) \right) g^{y_1^i, y_2^i} \left( \frac{A_i}{L_x} \sin(\theta) + \frac{B_i}{L_y} \cos(\theta) \right)$$

with N being a whole number, as large as possible (generally 100,000 in practice, or greater, in order to ensure a correct calculation of the expression), and:

$$f^{x_1^i, x_2^i}(u) = \Pi^a(x_1 - u)\Pi^a(x_2 - u)$$

$$g^{y_1^i, y_2^i}(v) = \exp\left(-\frac{j\pi f}{Dc_1 + Lc_2}, (y_1 - v)^2\right) \text{sinC}\left(\frac{2\pi}{\lambda z}(y_1 - v)b\right)$$

$$\exp\left(-\frac{j\pi f}{Dc_1 + Lc_2}, (y_2 - v)^2\right) \text{sinC}\left(\frac{2\pi}{\lambda z}(y_2 - v)b\right)$$

with a being the width of a transducer element of the linear transducer, b the height of the transducer element, D the distance between the linear transducer and the component, L the distance between the entry point of the beams and the point of interest, c1 the celerity in the propagation medium of the beams between the linear transducer and the component, c2 the celerity in the component as propagation medium of the beams, f the frequency of the ultrasonic beams, e the angular position of the probe, sin C the function $\sin(x)/x$, Lx and Ly the dimensions characteristic of the elongated microstructure and Ai and Bi random numbers drawn in a reduced centred normal distribution, $x_1^i$, $x_2^i$, $y_1^i$, $y_2^i$ random numbers drawn in a uniform distribution on the domains $[-a, a]$ for $x_1^i$ and $x_2^i$, and $[-b, b]$ for $y_1^i$ and $y_2^i$, and $\Pi^a$ is a gate function of width a.

This mathematical relationship makes it possible to better adjust the models with the series of intensity measurements. This mathematical relationship is valid for linear transducers comprising transducer elements of the linear type and of a dimension of the same order of magnitude as the dimensions of the grains of the microstructure.

The invention also relates to a non-destructive mapping device for a component comprising an elongated microstructure, to determine an elongation direction of the elongated microstructure at at least one point of interest of the component, characterised in that it comprises:
- a linear transducer extending along a main plane and comprising a plurality of transducer elements aligned along a main direction of said linear transducer,
- means for rotating the linear transducer in a plurality of angular positions each defining an angle of rotation around an axis of rotation passing through said at least one point of interest,
- means for emitting a plurality of elementary ultrasonic beams at each angular position by each of said plurality of transducer elements in the direction of said point of interest,
- means for measuring by each of said plurality of transducer elements the intensity at each angular position of a plurality of backscattered signals resulting from the backscattering of the elementary ultrasonic beams by said elongated microstructure,
said rotating means, emission means and measuring means being configured to obtain a first series of intensities measured along a first axis of rotation, and a second series of intensities measured along a second axis of rotation different from the first axis of rotation,
the mapping device further comprising means for combining the first series of intensities measured and the second series of intensities measured so as to determine the elongation direction of the microstructure at said at least one point of interest.

Advantageously, the mapping device according to the invention implements the mapping method according to the invention.

Advantageously, the mapping method according to the invention is implemented by the mapping device according to the invention.

The invention also relates to a mapping method and a mapping device characterised in combination by all or some of the features mentioned above or below.

5. LIST OF FIGURES

Figure 2:
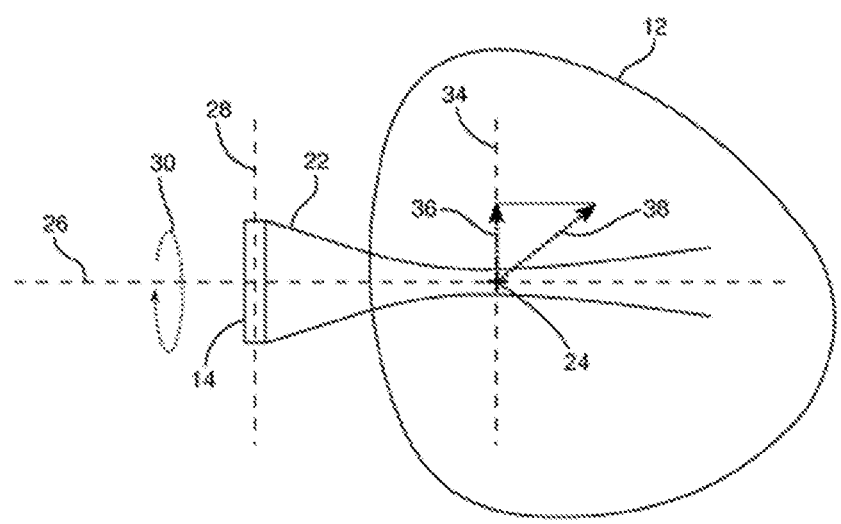
Figure 3:
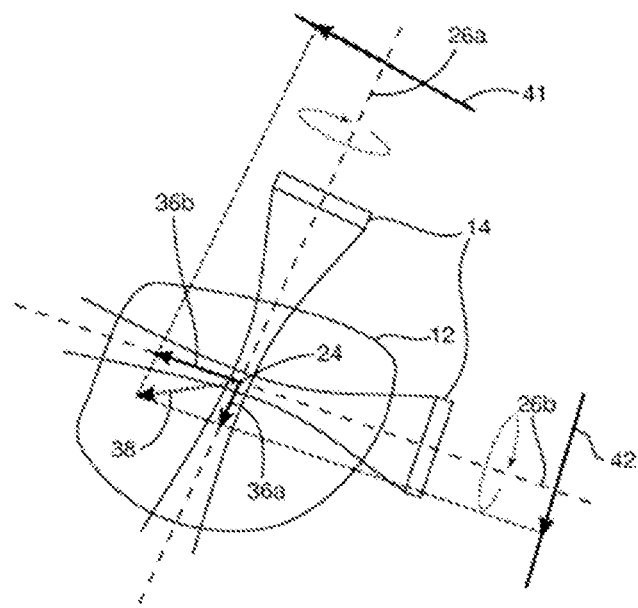
Figure 4:
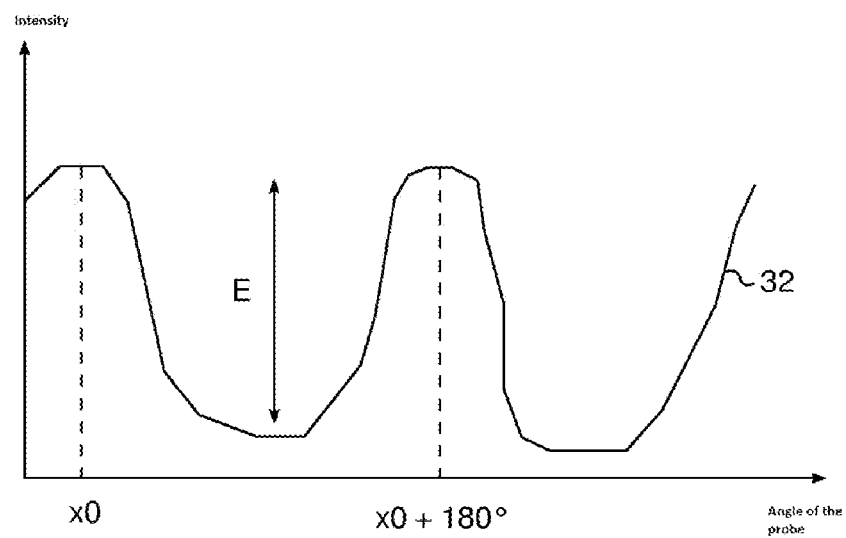
Figure 5:
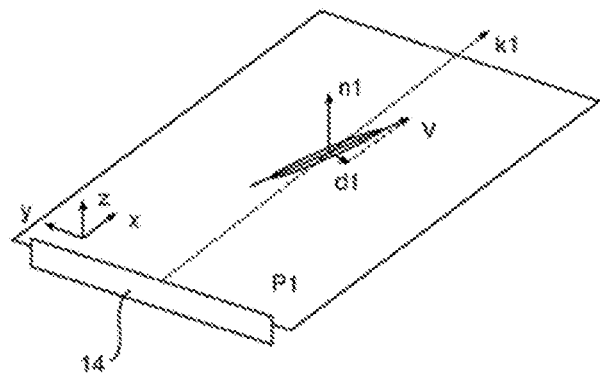
Figure 6:
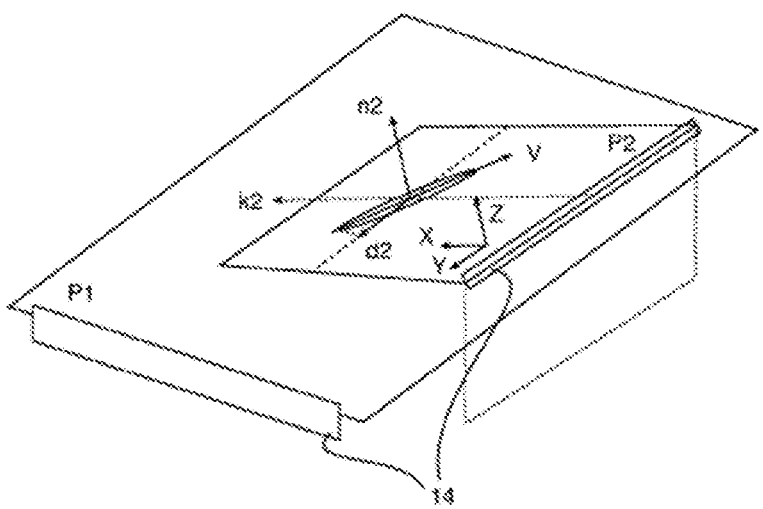
Figure 7:
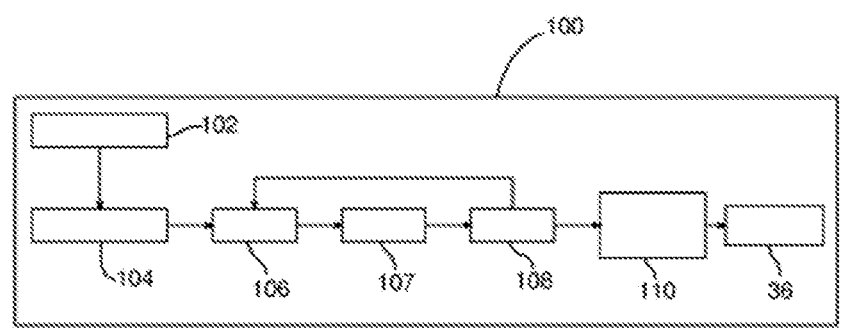
Figure 8:
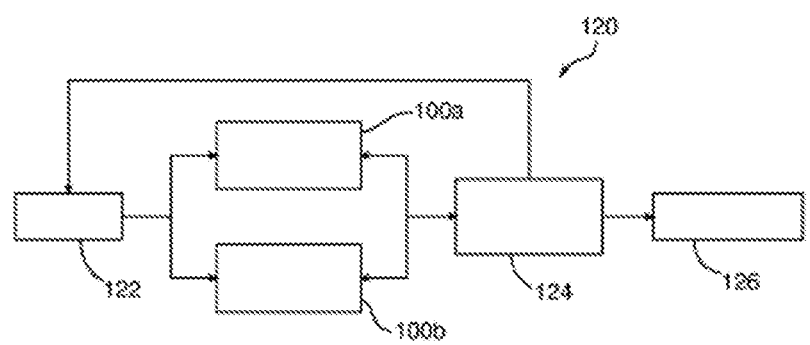

Other aims, features and advantages of the invention will appear upon reading the following description given only in a non-limiting manner, and which refers to the appended figures, in which:

FIG. 1 is a schematic view of a mapping device according to an embodiment of the invention, FIG. 2 is a schematic view of a portion of a mapping device according to an embodiment of the invention, FIG. 3 is a schematic view of a non-destructive mapping according to a mapping method according to an embodiment of the invention, FIG. 4 is an intensity curve of backscattered signals according to the angle of the linear transducer during the implementation of a mapping method according to an embodiment of the invention, FIG. 5 is a schematic view of a first step of a non-destructive mapping according to a mapping method according to an embodiment of the invention, FIG. 6 is a schematic view of a second step of a non-destructive mapping according to a mapping method according to an embodiment of the invention, FIG. 7 is a schematic view of an intensity measurement step of a mapping method according to an embodiment of the invention, FIG. 8 is a schematic view of a mapping method according to an embodiment of the invention.

6. DETAILED DESCRIPTION OF AN EMBODIMENT OF THE INVENTION

The following embodiments are examples. Although the description refers to one or more embodiments, this does not necessarily mean that each reference relates to the same embodiment, or that the features apply only to a single embodiment. Simple features of different embodiments can also be combined to provide other embodiments. In the figures, scales and proportions are not strictly respected for the purposes of illustration and clarity.

FIG. 1 schematically shows a mapping device 10 according to an embodiment of the invention, allowing a mapping and a non-destructive inspection of a component 12, to determine an elongation direction of the elongated microstructure at at least one point of interest of the component 12.

The mapping device 10 comprises a linear transducer 14 comprising a plurality of transducer elements aligned along a main direction of said linear transducer, arranged on means 16 for rotating said linear transducer 14, here a 6-axis robotic arm.

The transducer elements allow the emission of a plurality of elementary ultrasonic beams in the direction of the component. The ultrasonic beams are backscattered on the linear transducer 14 and this makes it possible to measure the intensity of these signals. The intensities measured are transmitted to a computer 18 for saving and processing, optionally after amplification by an amplifier 20. The computer 18 comprises means for rotating the linear transducer 14, means for emitting a plurality of elementary ultrasonic beams, measuring means and combination means making it possible to implement the mapping method described below.

FIG. 2 schematically shows a portion of a mapping device according to an embodiment of the invention. In particular, only the linear transducer 14 and the component 12 are shown.

The linear transducer 14 emits the plurality of elementary ultrasonic beams 22 at each angular position via each of the plurality of transducer elements in the direction of a point 24 of interest of the component. A single point of interest is shown in this figure (and in FIG. 3), but the aim is to reproduce the measurements stated here on a plurality of points of interest so as to define the elongated microstructure of the component. The plurality of ultrasonic beams 22 are focused towards a focus point combined with the point 24 of interest considered during the intensity measurement.

To determine the elongation direction of the elongated microstructure, the linear transducer 14 is arranged perpendicularly to an axis 26 of rotation and along a main plane 28.

The intensity measurement is taken according to an intensity measurement step of a mapping method, an intensity measurement step 100 of a mapping method according to an embodiment of the invention, schematically represented in FIG. 7.

The measurement step comprises a sub-step of determining 102 the point 24 of interest, in particular its coordinates. The linear transducer 14 is positioned so that the axis 26 of rotation passes through the point 24 of interest in a step 104 of positioning the linear transducer.

The measurement step then comprises a sub-step 106 of emitting the plurality of elementary ultrasonic beams 22 by each of said plurality of transducer elements in the direction of said point 24 of interest, wherein the plurality of beams are focused on the point 24 of interest.

Then a sub-step 107 of measuring by each of said plurality of transducer elements of the intensity at each angular position of a plurality of backscattered signals resulting from the backscattering of the elementary ultrasonic beams by said elongated microstructure makes it possible to recover the intensity measurements.

A sub-step 108 of rotating the linear transducer about the axis of rotation (also represented by the arrow 30 in FIG. 2) makes it possible to modify the angular position defining an angle of rotation about the axis 26 of rotation.

The sub-steps of emitting, measuring and rotating occur for all the predefined angular positions at which a measurement is sought to be obtained.

The measurements make it possible to obtain a curve of intensity of backscattered signals according to the angle of the linear transducer during the implementation of a mapping method according to an embodiment of the invention, as shown in FIG. 4.

The curve 32 has a periodic profile and a maximum intensity for an angle referenced x0. The amplitude of the curve is referenced E and furthermore corresponds to a confidence index of the elongation: it this is close to 0, this means that there is no or hardly any elongation (the curve is flat or almost flat), if it is close to 1, this means that the confidence on the existence of an elongation is very great. The angle x0 for which the intensity of backscattered signals received is at a maximum corresponds to a direction orthogonal to the elongation direction that this step makes it possible to measure. The angle for which the intensity of backscattered signals received is at a maximum itself corresponds to a direction parallel to the elongation direction that this step makes it possible to measure. To facilitate the processing of the curve and to reduce the risk of erroneous measurements, the curve can be standardised in the form of a sinusoidal function being expressed as follows:

$$f(x) = E \cos(w(x-x0)) + d$$

with w and d being adjustment variables to obtain the desired curve that best approximates to the measurements taken.

The elongation direction measured is always in a plane 34 parallel to the main plane 28 of the linear transducer 14. Thus, as represented in FIG. 2, the elongation direction 36 measured is a projection on the plane parallel to the main plane of the real elongation direction 38, which cannot therefore be determined directly. The projected direction is determined in a sub-step 110 of determining the projected direction, carried out by the computer 18, and makes it possible to obtain the direction projected in one point.

FIG. 3 schematically shows a non-destructive mapping according to a mapping method according to an embodiment of the invention, making it possible to determine an elongation direction closest to the real elongation direction.

To do this, the measurement step is carried out along two axes of rotation by the linear transducer 14, a first axis 26*a* of rotation and a second axis 26*b* of rotation different from each other, intersecting at the point 24 of interest and making it possible to determine two elongation directions 36*a* and 36*b* projected on different planes. The combination of these two projected directions makes it possible to obtain an elongation direction 38 close to the real elongation direction. Additional measurement steps along other axes of rotation can make it possible to also approach the real elongation direction, for example a measurement along a third axis of rotation orthogonal to the plane formed by the first and the second axis of rotation and passing through the point of interest.

The combination of the two projected directions is achieved by the following calculation:

That is:

V: being the direction of the real elongation direction described by a vector in a canonical basis (x, y, z). The direction of V is not important and will not be determined subsequently.

k1 and k2, the vectors corresponding to the direction towards which the linear transducer 14 points.

The first step consists in determining a first projected vector corresponding to a first elongation direction as can be seen in FIG. 5. The linear transducer is oriented along the vector k1 corresponding to the first axis of rotation and rotates around this axis. The minimum intensity measured according to the angle of the linear transducer corresponds to the vector d1, representing the projected elongation direction of the microstructure (the direction of this vector will also be arbitrary).

The orthonormal reference frame (x, y, z) can be selected such that the vector k1 is colinear with x and that the targeted point corresponds to the centre of the reference frame at the coordinates (0, 0, 0), and that the axis "y" is colinear with d1. The vectors k1 and d1 are thus expressed as follows:

$$k1 = \begin{pmatrix} 1 \\ 0 \\ 0 \end{pmatrix} \text{ and } d1 = \begin{pmatrix} 0 \\ E1 \\ 0 \end{pmatrix}$$

With E1, the confidence index determined during the adjustment of the standardised intensity/angle curve 32 and corresponding to the amplitude of this curve 32 (as described above).

The plane P1 (defined by the two vectors (k1, d1)) contains the elongation direction. The normal vector to this plane is denoted n1, and is written as:

$$n1 = \text{cross}(k1, d1)$$

(with the cross function corresponding to the vector product between the two vectors k1 and d1).

The equation of the plane P1 is:

$$\begin{pmatrix} x \\ y \\ z \end{pmatrix} \cdot n1 = 0$$

The components of n1 are written:

$$n1 = \begin{pmatrix} 0 \\ 0 \\ E1 \end{pmatrix}$$

Thus, the equation of the plane P1 is:

$$E1\, z = 0$$

k1 is colinear with x and d1 is colinear with y, thus n1 is colinear with z and the bases (x, y, z) and (k1, d1, n1) are combined.

If E1 equals 0, then either the medium has no elongation, or the elongation direction is coincident with k1

Once this first plane has been determined, the linear transducer 14 is moved to point in the direction represented by the vector k2 corresponding to the second axis of rotation, as shown in FIG. 6. By applying a second time the method for measuring intensity according to the angle of the linear transducer 14, the vector d2 corresponding to the minimum intensity is determined.

The vector k2 is expressed in (x, y, z) by using the rotation by the Euler angles $\psi$, $\theta$ and $\phi$ determined by the user to position the linear transducer according to k2. This set of three rotations makes it possible to define the orthonormal reference frame (X, Y, Z) the vector X of which is colinear with k2 and Y with d2.

The Euler angles are defined both by the orientation of the linear transducer and the projected elongation direction.

In the reference frame (X, Y, Z), the vectors k2 and d2 are expressed as:

$$k2 = \begin{pmatrix} 1 \\ 0 \\ 0 \end{pmatrix}$$

$$d2 = \begin{pmatrix} 0 \\ E2 \\ 0 \end{pmatrix}$$

With E2 the confidence index determined during the adjustment of the standardised intensity/angle curve.

The vectors k2 and d2 can then be expressed in the base (x, y, z) by using the following matrix multiplication:

$k2(O\ x, y, z) = P\ k2(O\ X, Y, Z)$

With:

$$P = \begin{pmatrix} \cos(\psi)\cos(\varphi) - \sin(\psi)\cos(\theta)\sin(\varphi) & -\cos(\psi)\sin(\varphi) - \sin(\psi)\cos(\theta)\cos(\varphi) & \sin(\psi)\sin(\theta) \\ \sin(\psi)\cos(\varphi) + \cos(\psi)\cos(\theta)\sin(\varphi) & -\sin(\psi)\sin(\varphi) + \cos(\psi)\cos(\theta)\cos(\varphi) & -\cos(\psi)\sin(\theta) \\ \sin(\theta)\sin(\varphi) & \sin(\theta)\cos(\varphi) & \cos(\theta) \end{pmatrix}$$

The vector normal to the plane P2 is defined by n2=cross(k2, d2) in the reference frame (x, y, z) and the equation of the plane P2 is defined by:

$$\begin{pmatrix} x \\ y \\ z \end{pmatrix} \cdot n2 = 0$$

Accepting that the components of n2 are written:

$$n2 = \begin{pmatrix} e \\ f \\ g \end{pmatrix}$$

Then the equation of the plane P2 is:

$ex+fy+gz=0$

The real elongation direction of the microstructure corresponds to the intersection of the planes P1 and P2, which amounts to solving the equation system:

$$\begin{cases} E_1\ z = 0 \\ ex + fy + gz = 0 \end{cases}$$

This system of equations is a straight line in space. The direction of the vector V is combined with this straight line. The direction of the vector V is unnecessary as it is non-existent physically.

FIG. 8 schematically shows a mapping method 120 according to an embodiment of the invention. For each point of interest that is to be studied, the coordinates of this point are taken in a first positioning step 122, and then at least two intensity measurement steps 100a and 100b are carried out along the different axes of rotation as explained above. The result of these two measurements is used in a step 124 of combining the first series of intensities measured and the second series of intensities measured so as to determine the elongation direction of the microstructure at said point of interest. The calculation allowing the combination has been described above.

The positioning, measuring and combining steps are repeated for each point of interest.

When a plurality of points of interest and elongation directions determined for each point of interest are available, the method can implement a step 126 of 3D mapping the component associating with each point of interest its elongation direction in a 3D representation of the component.

The invention claimed is:

1. Method for a non-destructive mapping of a component comprising an elongated microstructure, to determine an elongation direction of the elongated microstructure at at least one point of interest of the component, wherein said method includes at least two successive intensity measurement steps comprising the following steps:

a sub-step of rotating a linear transducer in a plurality of angular positions each defining an angle of rotation about an axis of rotation passing through said at least one point of interest, said linear transducer extending along a main plane and comprising a plurality of transducer elements aligned along a main direction of said linear transducer, a sub-step of emitting a plurality of elementary ultrasonic beams at each angular position by each of said plurality of transducer elements in the a direction of said point of interest, a sub-step of measuring by each of said plurality of transducer elements of the intensity at each angular position of a plurality of backscattered signals resulting from the backscattering of the elementary ultrasonic beams by said elongated microstructure, a first intensity measurement step of making it possible to obtain a first series of intensities measured along a first axis of rotation, and a second intensity measurement step making it possible to obtain a second series of intensities measured along a second axis of rotation different from the first axis of rotation, and in that the method comprises a step of combining the first series of measured intensities and the second series of measured intensities so as to determine the elongation direction of the microstructure at said at least one point of interest and a mapping step attributing at each point, the elongation direction determined at said point.

2. Non-destructive mapping method according to claim 1, wherein the emission sub-step comprises focusing of the elementary ultrasonic beams at a focus point corresponding to said at least one point of interest.

3. Non-destructive mapping method according to claim 1, wherein the intensity measurement sub-step further comprises a standardisation of the intensities measured according to a sinusoidal function expressing the intensity measured according to the angle of rotation of the transducer, the sinusoidal function having in particular, as a parameter, an amplitude representing a confidence index (E) of the elongation, and the angle (x0) at which the sinusoidal function reaches its maximum defines a straight line perpendicular to the elongation direction at said at least one point of interest along a plane parallel to the main plane of the linear transducer.

4. Non-destructive mapping method according to claim 1, wherein the elongation direction of the microstructure is determined for a plurality of points of interest distributed on the component and in that it comprises a step of 3D mapping of the component associating with each point of interest its elongation direction in a 3D representation of the component.

5. Non-destructive mapping method according to claim 1, wherein the angle between the first axis of rotation and the second axis of rotation is between 20° and 90°.

6. Non-destructive mapping method according to claim 1, wherein said method includes a step of determining actual dimensions of grains of the elongated microstructure at said point of interest, said step comprising:
- a step of calculating models of backscattered intensity according to a predetermined mathematical relationship, each model being calculated with said mathematical relationship by taking as parameters different dimensions of the grains of the elongated microstructure,
- a step of comparing one of the series of intensities measured with said models of intensity, the actual dimensions of the grains of the elongated microstructure corresponding to the dimensions used as a parameter with the backscattered model of intensity closest to the series of intensities measured.

7. Non-destructive mapping method according to claim 6, wherein the predetermined mathematical relationship is written in the form:

$$I(\theta) = \frac{1}{N}$$

$$\sum_{i=1}^{N} \frac{2\pi(2a)^2(2b)^2}{L_x L_y} f^{x_1^i, x_2^i} \left( \frac{A_i}{L_x} \cos(\theta) - \frac{B_i}{L_y} \sin(\theta) \right) g^{y_1^i, y_2^i} \left( \frac{A_i}{L_x} \sin(\theta) + \frac{B_i}{L_y} \cos(\theta) \right)$$

with N being a whole number, preferably greater than 100,000, and:

$$f^{x_1^i, x_2^i}(u) = \Pi^a(x_1 - u)\Pi^a(x_2 - u)$$

$$g^{y_1^i, y_2^i}(v) = \exp\left(-\frac{j\pi f}{Dc_1 + Lc_2}, (y_1 - v)^2\right) \operatorname{sinC}\left(\frac{2\pi}{\lambda z}(y_1 - v)b\right)$$

$$\exp\left(-\frac{j\pi f}{Dc_1 + Lc_2}, (y_2 - v)^2\right) \operatorname{sinC}\left(\frac{2\pi}{\lambda z}(y_2 - v)b\right)$$

with a being the width of a transducer element of the linear transducer, b the height of the transducer element, D the distance between the linear transducer and the component, L the distance between the entry point of the beams and the point of interest, c1 the celerity in the propagation medium of the beams between the linear transducer and the component, c2 the celerity in the component as propagation medium of the beams, f the frequency of the ultrasonic beams, $\theta$ the angular position of the probe, sinC the function sin(x)/x, $L_x$ and $L_y$ the dimensions characteristic of the elongated microstructure and Ai and Bi random numbers drawn in a reduced centred normal distribution, $x_1^i$, $x_2^i$, $y_1^i$, $y_2^i$ random numbers drawn in a uniform distribution on the domains [−a, a] for $x_1^i$ and $x_2^i$, and [−b, b] for $y_1^i$ and $y_2^i$, and $\Pi^a$ is a gate function of width a.

8. Non-destructive mapping device for a component comprising an elongated microstructure, to determine an elongation direction of the elongated microstructure at at least one point of interest of the component, wherein it comprises:
- a linear transducer extending along a main plane and comprising a plurality of transducer elements aligned along a main direction of said linear transducer,
- means for rotating the linear transducer in a plurality of angular positions each defining an angle of rotation about an axis of rotation passing through said at least one point of interest,
- means for emitting a plurality of elementary ultrasonic beams at each angular position by each of said plurality of transducer elements in a direction of said point of interest,
- means for measuring by each of said plurality of transducer elements the intensity at each angular position of a plurality of backscattered signals resulting from the backscattering of the elementary ultrasonic beams by said elongated microstructure,
- said rotating means, emission means and measuring means being configured to obtain a first series of intensities measured along a first axis of rotation, and a second series of intensities measured along a second axis of rotation different from the first axis of rotation, the mapping device further comprising means for combining the first series of intensities measured and the second series of intensities measured so as to determine the elongation direction of the microstructure at said at least one point of interest.

* * * * *